S. J. BADCOCK.
NUT LOCK.
APPLICATION FILED OCT. 17, 1911.

1,086,980.

Patented Feb. 10, 1914.

Inventor
Shirley J. Badcock

Witnesses
Philip E. Barnes

By Victor J. Evans
Attorney

COLUMBIA PLANOGRAPH CO., WASHINGTON, D. C.

UNITED STATES PATENT OFFICE.

SHIRLEY J. BADCOCK, OF ASTORIA, OREGON.

NUT-LOCK.

1,086,980. Specification of Letters Patent. Patented Feb. 10, 1914.

Application filed October 17, 1911. Serial No. 655,099.

*To all whom it may concern:*

Be it known that I, SHIRLEY J. BADCOCK, a citizen of the United States, residing at Astoria, in the county of Clatsop and State of Oregon, have invented new and useful Improvements in Nut-Locks, of which the following is a specification.

This invention relates to nut locks, and has for an object to provide a device of this character which will not necessitate any particular mutilation of the nut and which will include locking means on the nut adapted to engage the bolt to hold the nut positively against retrograde movement after the same has been adjusted to its work.

Another object of the invention is to provide a locking device which will be positioned on the nut so that when the latter is in its clamped engagement with its work the former will be completely housed and thereby held against accidental loss or displacement.

Figure 1:
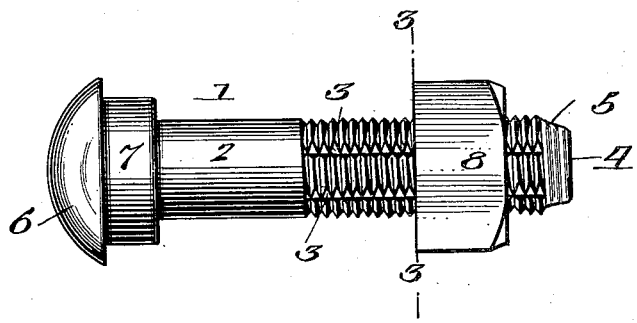
Figure 2:
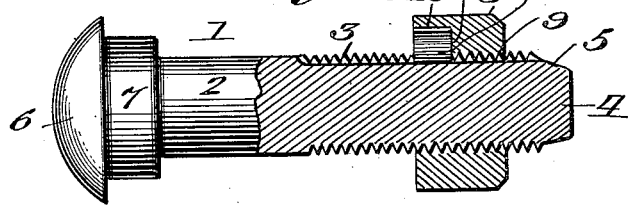
Figure 3:
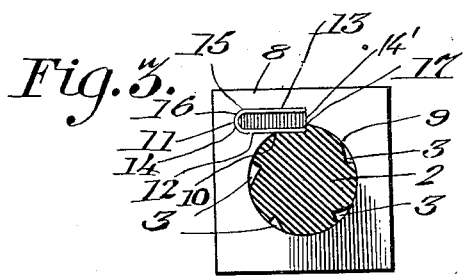
Figure 4:
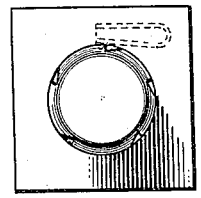

In the drawing, forming a portion of this specification and in which like numerals of reference indicate similar parts in the several views: Figure 1 is a side view of a nut and bolt, the former having applied thereto my improved locking device. Fig. 2 is a longitudinal section therethrough. Fig. 3 is a section on line 3—3 of Fig. 1 showing the locking device engaged in one of the locking grooves of the bolt. Fig. 4 is a section similar to Fig. 3 showing the locking device engaged with the guiding surface of the bolt.

My improved nut lock includes a bolt 1 having a shank 2 which is threaded intermediate of its ends and provided with a longitudinal series of locking grooves 3. The outer end of the shank 2 is reduced, at 4, and tapered slightly, at 5, in the direction of the first thread of the shank. The opposite end of the shank is provided with a head 6 and a locking boss 7, the latter being substantially of elliptical configuration and being adapted to enter a correspondingly formed recess in the material in which the bolt is engaged so as to hold the bolt against rotation.

The nut 8 is provided with the usual bolt-receiving threaded bore or passage 9 which communicates laterally, at 10, with a recess 11, the latter being arranged tangential to the bolt-receiving bore or passage of the nut. The recess 11 is defined by the parallel walls 12 and 13, the curved wall 14 and the straight wall 14'. A locking device embodying a flat leaf spring 15 is mounted in the recess 11 and is yieldingly engaged with the opposite parallel walls thereof, the said spring having a curved part 16 which fits the correspondingly curved wall of the recess so as to hold the spring against accidental displacement. The locking portion 17 of the spring extends slightly into the bolt-receiving passage 9 of the nut, being movable radially with respect to the axis of the bolt so as to permit of its locking engagement in the grooves 3. The recess 11 opens onto the inner face of the nut so that when the latter is in its full adjusted position on the bolt and in frictional contact with its work or object in which the bolt is engaged the spring locking device will be housed and securely held against any accidental loss or displacement.

On the initial association of the nut with the bolt the former is placed on the reduced portion 4 of the bolt and then rotated, pressure being exerted against the nut so as to cause the same to be moved onto the surface 5 and to be guided thereby onto the threaded portion of the shank. On adjustment of the nut in one direction on the bolt the locking spring will automatically engage in the grooves 3 and thereby hold the nut against retrograde movement. Incident to the provision of the portions 4 and 5 of the shank of the bolt, no means whatsoever need be employed for holding the locking spring released on its initial association with the bolt.

I claim:

1. In combination, a bolt having a series of longitudinal grooves, a nut adjustably mounted thereon and provided with a substantially U-shaped recess arranged tangentially and communicating with the bore of said nut and defining parallel side walls, and a spring corresponding to the shape and size of said recess and snugly arranged therewithin and having the ends adapted for interchangeable locking engagement in said grooves.

2. In combination, a bolt having a series of longitudinal grooves, a nut adjustably mounted thereon and provided with a substantially U-shaped recess arranged tangentially and communicating with the bolt receiving passage of the nut and defining parallel side walls and a straight end wall adapted to aline with the wall of the groove when in locked position, a U-shaped locking spring snugly seated within said recess and having its leg portions of equal length, one of said leg portions being adapted to bear against said straight wall of the nut and the said legs being adapted for interchangeable locking engagement in said grooves.

In testimony whereof I affix my signature in presence of two witnesses.

SHIRLEY J. BADCOCK.

Witnesses:
PAULINE BECK,
A. R. CYRUS.

Copies of this patent may be obtained for five cents each, by addressing the "Commissioner of Patents, Washington, D. C."